US009816813B2

(12) United States Patent
Lettau et al.

(10) Patent No.: US 9,816,813 B2
(45) Date of Patent: Nov. 14, 2017

(54) HANDHELD MEASURING AID FOR USE WITH A SIX-DEGREES-OF-FREEDOM LASER TRACKER

(71) Applicant: Leica Geosystems AG, Heerbrugg (CH)

(72) Inventors: Michael Lettau, Laufenburg (DE); Marco Lüscher, Brugg (CH); Burkhard Böckem, Rieden (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 838 days.

(21) Appl. No.: 14/274,004

(22) Filed: May 9, 2014

(65) Prior Publication Data

US 2014/0343890 A1    Nov. 20, 2014

(30) Foreign Application Priority Data

May 10, 2013 (EP) .................................. 13167394

(51) Int. Cl.
*G01B 11/24* (2006.01)
*G01C 15/00* (2006.01)
(Continued)

(52) U.S. Cl.
CPC ........... *G01C 15/002* (2013.01); *G01B 5/004* (2013.01); *G01B 11/002* (2013.01); *G01S 5/163* (2013.01);
(Continued)

(58) Field of Classification Search
CPC .......... G01S 17/66; G01S 17/42; G01S 17/06; G01B 11/002; G01B 11/026; G01B 11/03;
(Continued)

(56) References Cited

U.S. PATENT DOCUMENTS 5,973,788 A * 10/1999 Pettersen ................ G01S 5/163
356/614
7,805,851 B2 * 10/2010 Pettersson .............. G01B 5/008
33/503
(Continued)

FOREIGN PATENT DOCUMENTS

EP       0553266       10/1993
EP       0797076 A2    9/1997
(Continued)

OTHER PUBLICATIONS

European Search Report dated Oct. 11, 2013 as received in Application No. EP 13 16 7394.

*Primary Examiner* — Hoa Pham
(74) *Attorney, Agent, or Firm* — Maschoff Brennan

(57) ABSTRACT

Some embodiments of the invention relate to a handheld measuring aid for use in a system—having a station for position and orientation determination of the handheld measuring aid—for surveying an object surface. the handheld measuring aid has in this case on a body, visual markings which are arranged in a defined spatial relationship, forming a pattern, on the body in a marking region, a measuring probe, which is arranged on an orifice of the body in a defined spatial relationship in relation to the pattern, for the object surface, an operating element, an electronic circuit for generating a measurement triggering signal—occurring as a function of an actuation of the operating element—and wireless communication means for transmitting the measurement triggering signal to the station.

18 Claims, 9 Drawing Sheets

(51) Int. Cl.
*G01S 17/02* (2006.01)
*G01S 17/66* (2006.01)
*G01S 5/16* (2006.01)
*G01S 7/00* (2006.01)
*G01S 7/481* (2006.01)
*G01B 5/004* (2006.01)
*G01B 11/00* (2006.01)

(52) U.S. Cl.
CPC .............. *G01S 7/006* (2013.01); *G01S 7/481* (2013.01); *G01S 17/023* (2013.01); *G01S 17/66* (2013.01)

(58) Field of Classification Search
CPC .......... G01B 21/04; G01B 7/008; G01B 7/28; G01C 15/00; G01C 15/002; G06F 3/017; G06F 3/0325; G06F 3/03545
USPC ..... 348/46; 356/3.16, 141.3, 141.1, 601–623
See application file for complete search history.

(56) References Cited

U.S. PATENT DOCUMENTS

| | | | |
|---|---|---|---|
| 8,537,376 B2* | 9/2013 | Brown | G01C 15/002 356/614 |
| 8,558,992 B2* | 10/2013 | Steffey | G01C 15/002 356/3.01 |
| 8,723,803 B2* | 5/2014 | Banning | G03B 21/00 345/157 |
| 9,330,448 B2* | 5/2016 | Dickinson | G06T 7/0004 |
| 2004/0160594 A1* | 8/2004 | Suphellen | G01B 11/002 356/4.01 |
| 2008/0111985 A1 | 5/2008 | Bridges | |
| 2009/0318756 A1* | 12/2009 | Fisher | A61B 1/04 600/109 |
| 2010/0091112 A1 | 4/2010 | Veeser et al. | |
| 2011/0046917 A1* | 2/2011 | Lippuner | G01B 21/045 702/150 |
| 2011/0119025 A1 | 5/2011 | Fetter et al. | |
| 2012/0262550 A1 | 10/2012 | Bridges | |
| 2013/0293684 A1* | 11/2013 | Becker | G01B 11/245 348/47 |
| 2017/0108528 A1* | 4/2017 | Atlas | G01P 13/025 |

FOREIGN PATENT DOCUMENTS

| | | |
|---|---|---|
| EP | 1 498 688 A1 | 1/2005 |
| EP | 1 798 688 A1 | 1/2005 |
| EP | 2 246 005 A1 | 11/2010 |
| EP | 2801841 A1 | 11/2014 |
| WO | 93/07443 A1 | 4/1993 |
| WO | 97/14015 A1 | 4/1997 |
| WO | 2007/124009 A2 | 11/2007 |
| WO | 2007/124010 A2 | 11/2007 |

* cited by examiner

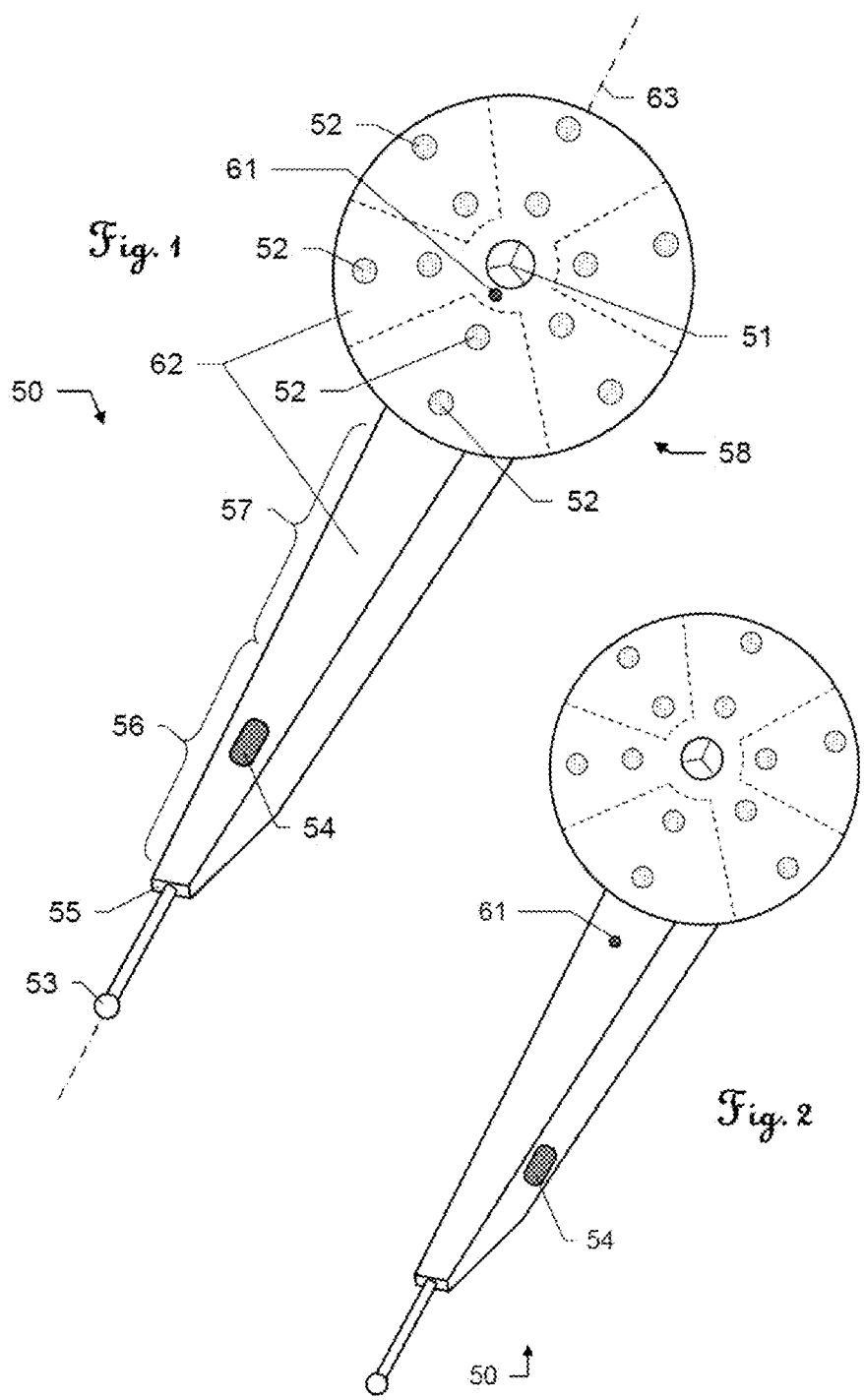

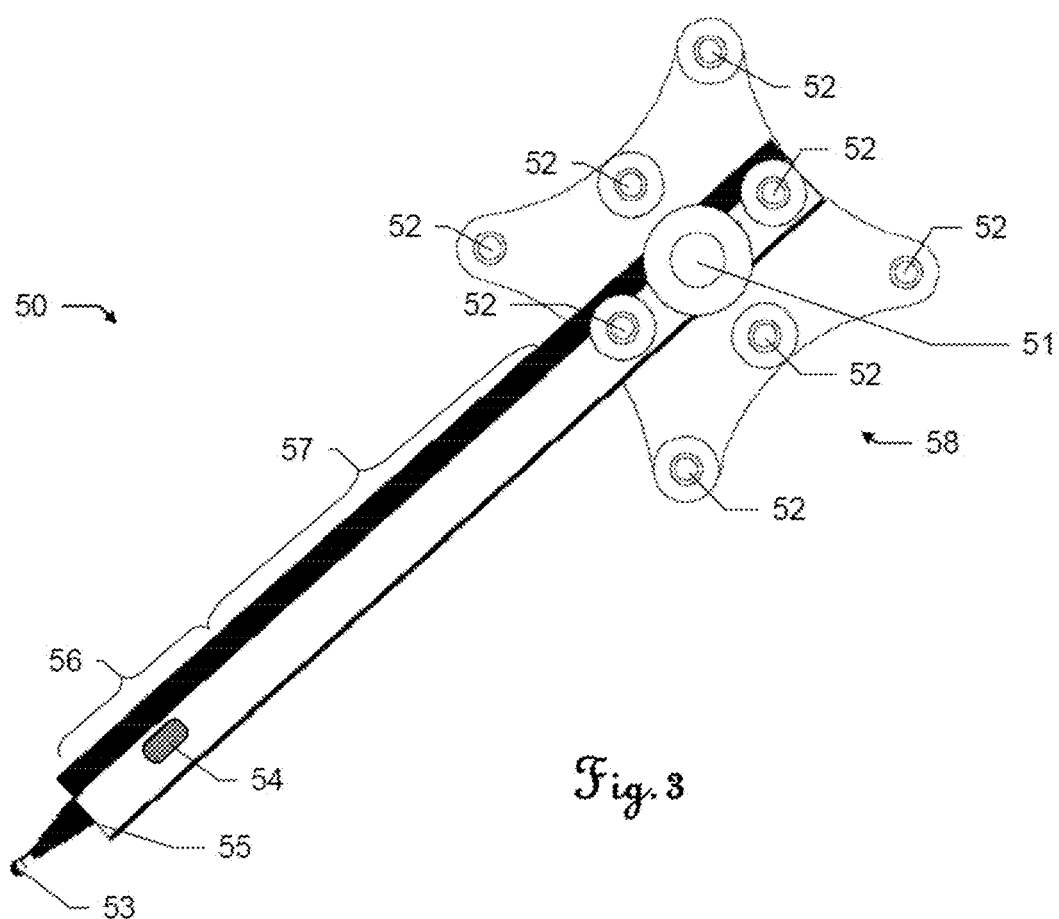

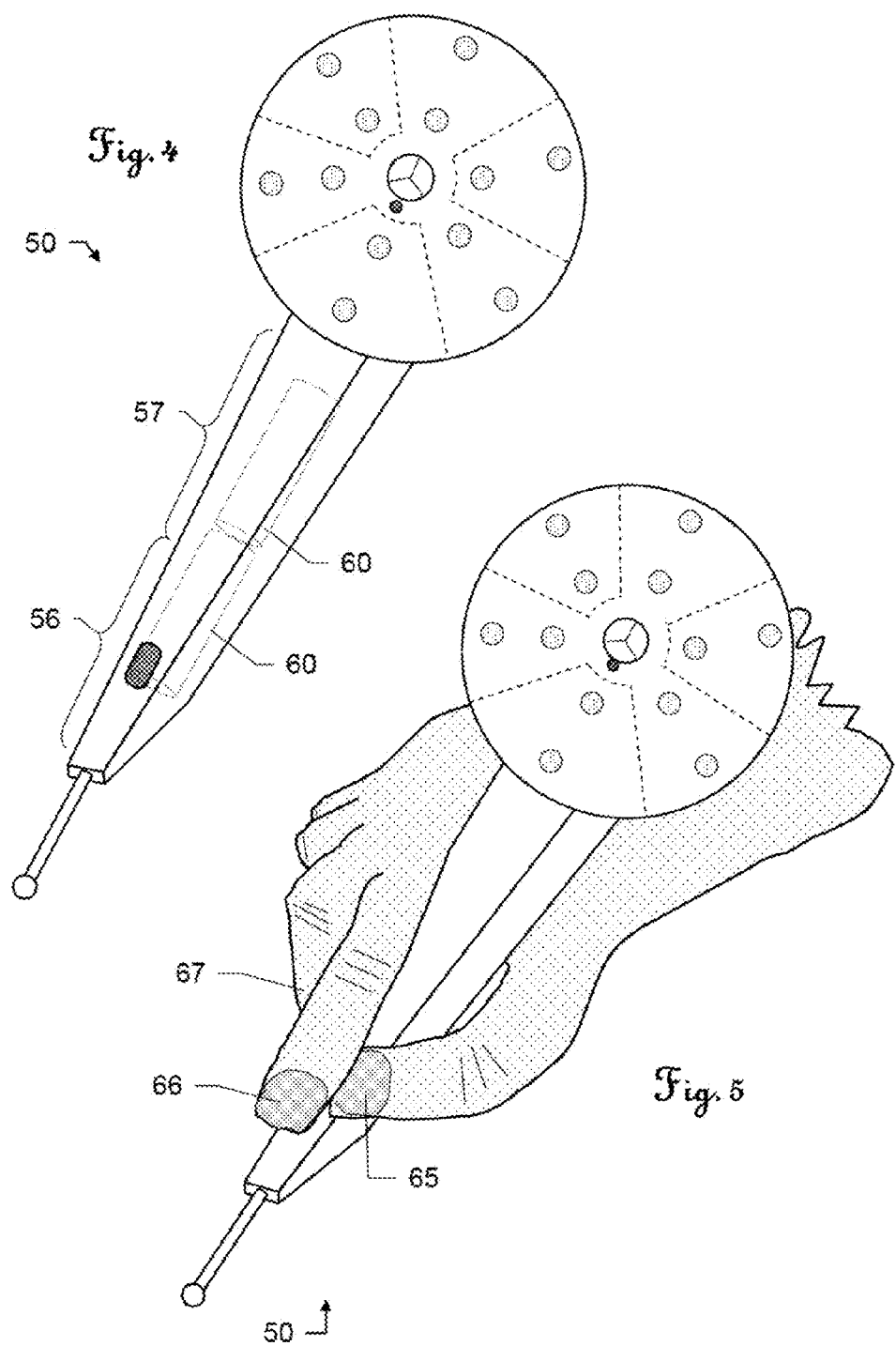

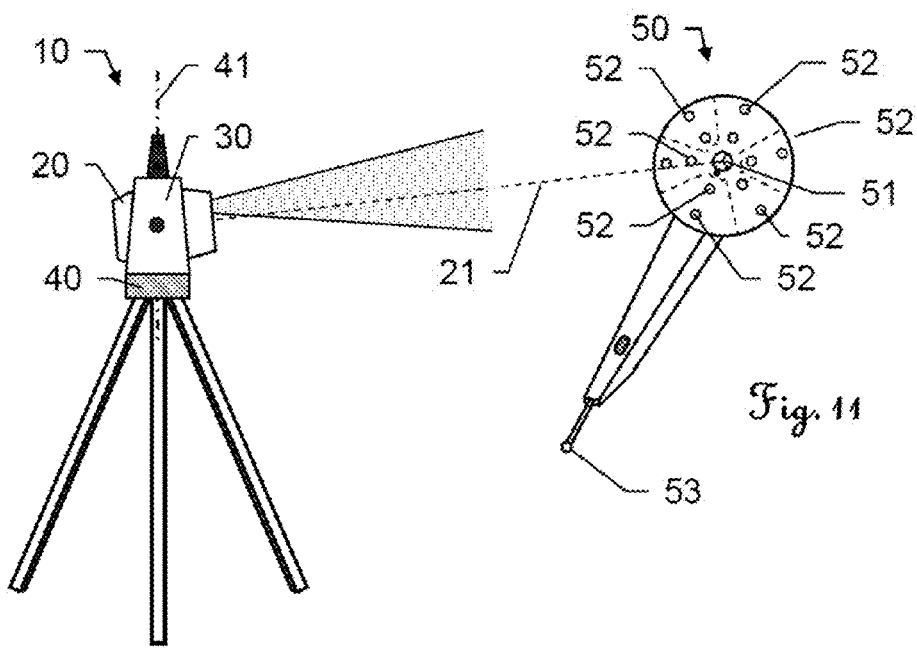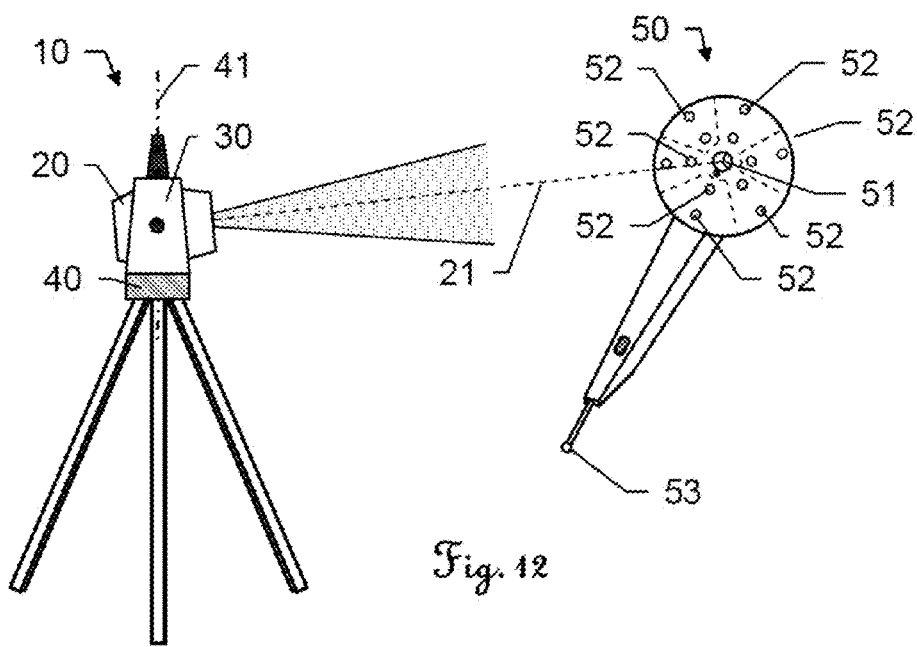

HANDHELD MEASURING AID FOR USE WITH A SIX-DEGREES-OF-FREEDOM LASER TRACKER

FIELD OF THE INVENTION

The invention relates to a handheld measuring aid for use in a system—having a station for position and orientation determination of the measuring aid—for surveying an object surface.

BACKGROUND

Such industrial measuring systems, which are implemented for coordinate position determination of points on a surface, and are formed by a handheld measuring aid in cooperation with a station which surveys the measuring aid in space—such as a six-degrees-of-freedom laser tracker in particular—have been known for some time from the prior art.

Examples of such systems are described, for example, in the patent literature publications WO 1993/07443 A1, WO 1997/14015 A1, WO 2007/124009 A2, or WO 2007/124010 A2, or are also known in the form of the products laser tracker "AT901" and measuring aid "T probe", sold by Leica Geosystems AG.

Such a handheld measuring aid instrument has for this purpose a measuring probe for the object surface, which is arranged on a body of the measuring aid, in particular having a tactile ball to be used for physically contacting a measuring point on the object surface (wherein here notches, holes, concealed points, etc. are also to be understood to form part of the measured object surface of a measured object throughout). Furthermore, visual markings are provided, which are arranged, forming a pattern, on the body in a defined spatial relationship to one another and in relation to the measuring probe in a marking region.

The visual markings can be provided in particular in this case by passive or active light spots, which can be acquired by a camera, in particular wherein the markings are formed by reflectors or by LEDs (light-emitting diodes).

The measuring stations (such as laser trackers in particular) to be used together with the measuring aids can then be embodied, to acquire these markings, having an optical image acquisition unit having a two-dimensional, light-sensitive array, for example, a CCD or CID camera or a camera based on a CMOS array (or having another pixel array sensor) and having an image processing unit. The camera can be installed in this case in particular on the station in such a manner that the positions thereof in relation to one another are not variable. For example, the camera is installed on the station in such a manner that it is pivotable by a motor about one or about two axes and therefore can also track the measuring aid during movement, so that it remains in the region of vision of the camera.

A special example of such measuring stations is represented by the laser tracker with camera. A target point, which can be finely targeted and tracked, for such a laser tracker is formed in this case by a retroreflective unit (for example, a cube prism or corner cube retroreflector), which is targeted using an optical laser measuring beam of the measuring device. The laser beam is reflected by the retroreflector in parallel back to the measuring device, wherein the reflected beam is acquired using an acquisition unit of the device. In this case, an emission or reception direction of the beam is ascertained, for example, by means of sensors for angle measurement, which are associated with a deflection mirror or a targeting unit of the system. In addition, with the acquisition of the beam, a distance from the measuring device to the retroreflector is ascertained, for example, by interferometry or by means of runtime and/or phase difference measurement.

For the cooperation of a measuring aid with a laser tracker, the measuring aid generally has a retroreflector at a central point of its marking region, which can be targeted, tracked, and surveyed in position in three dimensions automatically with high precision by the laser tracker.

For this purpose, laser trackers according to the prior art generally have a tracking surface sensor in the form of a position-sensitive surface detector (for example, a PSD or a CCD or CMOS sensor), wherein measuring laser radiation reflected on the target can be detected thereon and a corresponding output signal can be generated. By means of a downstream or integrated electronic system, the output signal can be analyzed and a focal point can be ascertained, for example. By means of this tracking and fine targeting sensor, a divergence of the point of incidence (focal point) of the acquired beam from a servo-control zero point can thus be determined and, on the basis of the divergence, precise targeting or—in the event of movement—tracking of the laser beam on the retroreflector can be performed. An acquisition using the tracking and fine targeting sensor is performed coaxially to the measuring axis, so that the acquisition direction corresponds to the measuring direction. The application of the tracking and the fine targeting can first be performed after the measuring laser has been aligned at least coarsely on a retroreflective target, in such a manner that the measuring laser beam is incident on the retroreflector (considered at least somewhere in the beam cross section of the measuring laser beam). After more precise targeting, angle and distance measurement is performed—as described above—for the actual surveying of the retroreflector.

The further three degrees of freedom of the measuring aid are determined by recording an image of the markings and corresponding image processing. The unit which guides the laser beam and the camera can in this case be formed in particular in such a manner that their positions in relation to one another are not variable. For example, the camera is rotatable together with the unit about an essentially perpendicular axis, but is pivotable up-and-down independently from the guiding unit and is therefore arranged separately from the optic of the laser beam in particular. Alternatively, the camera can also be embodied as only pivotable about one axis. Furthermore, however, the camera can also alternatively be installed in an integrated construction together with the beam-guiding unit in a rotatable and pivotable shared housing.

Using the acquisition and analysis of the image—by means of image acquisition and image processing units—of the visual markings, the relative location of which to one another is known, the orientation of the measuring aid instrument in space can thus be concluded. Together with the determined spatial position of the retroreflector, the position and orientation of the measuring aid in space can therefore be precisely determined absolutely (or at least in relation to the laser tracker)—and therefore finally the surface point, which is contacted in a tactile or optical manner by the probe of the measuring aid instrument.

Alternatively to the use of a laser tracker as a surveying station for the measuring aid, the station can also be designed in such a manner that six-degrees-of-freedom surveying of the measuring aid can also be performed in a solely camera-based manner, as is described in the above-mentioned patent literature publications WO 2007/124009 A2 or WO 2007/124010 A2.

The measuring aid instrument can furthermore also be, in a way known to a person skilled in the art, a handheld scanner, which is equipped for short-range measurement, for contactless surface surveying, wherein the direction and position of the scanner measuring beam used for the short-range measurement are precisely known in relation to the light spots and reflectors, which are arranged on the scanner. Such a scanner is described, for example, in EP 0 553 266 or also is known in the form of the product "T-Scan", sold by Leica Geosystems AG.

Measuring aid instruments held in one hand which are known in the prior art are constructed as two-sided in this case, having a front side to be aligned toward the measuring station, on which the visual markings (and also optionally the retroreflector) are arranged in the marking region—all pointing in a joint direction (→ pointing perpendicularly away from the front side)—and a rear side, on which a grip handle to be gripped in an enclosing manner like a rod by a hand (also called a first grip) of a user is arranged.

For some requirements (for example, for special measuring tasks), the first grip (the encompassing grip like a rod of such a handle) can also cause disadvantages, however.

SUMMARY

Some embodiments of the invention provide for a measuring aid for use in a system—having a station for position and orientation determination of the handheld measuring aid—for surveying an object surface, using which measuring aid work and surveying can be performed in special situations and for special requirements in a manner which is improved and/or simplified for the user.

The handheld measuring aid, which is relevant to the invention, for use in a system—having a station for position and orientation determination of the measuring aid—for surveying an object surface has the following features in this case, as is known according to principle and function in the prior art:
 a body is provided as a carrier body for the individual components,
 visual markings are provided, which are arranged in a defined spatial relationship, forming a pattern, on the body in a marking region,
 a measuring probe for the object surface is provided, which is arranged on an orifice of the body in a defined spatial relationship in relation to the pattern, in particular having a ball to be used in a tactile manner for the physically contacting a measuring point on the object surface,
 a first operating element actuatable by a user is arranged on the body,
 an electronic circuit is integrated for generating a signal—occurring as a function of an actuation of the first operating element—which is indicative of a triggering of a position and orientation determination of the measuring aid which can be carried out by the station, and
 wireless communication means are provided for transmitting the signal to the station.

However, the measuring aid according to the invention moves away from measuring aid instruments known in the prior art by way of a novel design with respect to dimension and shape of some of the individual functional units and components and by way of a novel, altered way of arrangement or spatial composition of some of the individual functional units and components of the measuring aid, so that thus a novel manner of holding (manner of gripping), which is significantly advantageous for some situations over the heretofore known first grip handling, is made possible or provided in measurement use position of the measuring aid.
 Specifically
 the overall dimensioning and the weight distribution of the measuring aid are designed in such a manner and the arrangement localities of the visual markings on the body are selected in such a manner,
 a first section of the body extending away from the orifice is composed, shaped, and dimensioned in such a manner, and
 the first operating element is arranged on the first section of the body in such a manner,
that the measuring aid is provided in the measuring position to be held in one hand like a pen (i.e., occurring in the so-called precision grip)—wherein the first section is used as a gripping region for at least thumb and index finger (and in particular also middle finger) of the user—and also that in this measurement position the operating element is actuatable using the gripping index finger or the gripping thumb.

I.e., according to the invention, the design adjustment screws with respect to overall dimensioning and weight distribution of the measuring aid, with respect to placement of the marking region, embodiment of a first section, and placement of the first operating element are to be turned in such a manner that the specified function—namely ability to grip like a pen in the measurement position—is fulfilled.

It is thus to be noted with respect to overall dimensioning that it is to be selected such that the guiding and mobility of the measuring aid like a pen (i.e., occurring in the precision grip) within the arm range is not obstructed in practically any arm position in the arm range volume by the angled arm itself or by the upper body/head of the user, i.e., the upper part of the measuring aid extending away from the first section—observed in the measuring position having the orifice for the measuring probe downward—has an extent which, on the one hand, provides space for the marking region, but does not influence the free mobility (head, shoulder, arms) or the vision of the user holding the measuring aid. For example, the upper part has a longitudinal extension in the direction of the rolling axis of the measuring aid instrument of at most 20 cm.

For the weight distribution, it is relevant in particular that the upper part corresponds with respect to weight to the measuring probe part (i.e., the part of the measuring aid which extends downward from the finger engagement surfaces of the first section) in such a manner (i.e., the parts do not turn out unequally with respect to weight in such a manner), that also an inclined (or also horizontal) position of the measuring aid, which is held using three fingers like a pen, can be assumed comfortably and can be held well by a user, and excessively strong torque does not act on the holding hand due to imbalance of the two mentioned parts in this case. In this case, it is to be considered in particular that due to the lever action, components arranged more remotely from the first section in the upper part or measuring probe part ensure a higher perceptible imbalance for the holding user than if the comparable components were placed closer to the first section in the upper part or measuring probe part.

In this context, it can therefore be advantageous to house the heavier components of the measuring aid (in particular the power supply source [for example, accumulator cells or batteries])—partially or entirely—at a position in the upper part as close as possible to the first section or (again entirely or partially) even in or integrated in the first section (for which purpose the power supply source is dimensioned corresponding to the first section with respect to dimensions or shape).

The measuring probe part is to be designed to be comparatively short in this case, since otherwise in the precision grip attitude according to the invention, the measuring probe would not be able to be precisely guided or positioned. For example, the region of the measuring aid instrument between the finger engagement surfaces of the first section downward up to the orifice has a longitudinal extension in the direction of the rolling axis of at most between 2 and 4 cm.

Furthermore, the arrangement localities/spaces of the visual markings are to be selected in such a manner that they are arranged on a side which, in the provided holding position (in particular also with respect to the rolling axis of the measuring aid), points away from the body of the operator, who holds the measuring aid in a naturally bent arm attitude. In addition, the marking region is to be placed and dimensioned on this side in such a manner that in the case of the provided holding position, none of the markings are concealed by the hand.

The first section is to be provided in this case such that at least for index finger and thumb of the hand of the user, respectively a defined gripping surface (or contact surface) is provided and the body is designed in the first section in its thickness (i.e., in its transverse dimensioning, i.e., with respect to the extent of a cross section with respect to the rolling axis) such that this section can be clamped comfortably in the pen grip between index finger, thumb, and middle finger. The first section can have in this case, for example, a mean transverse/depth extension transversely to the rolling axis of the measuring aid of at most 4 cm.

The upper part of the measuring aid is furthermore advantageously designed and shaped in this case in such a manner that a further support point is formed by the upper part at a corresponding position, at which the measuring aid is provided for contact on a hand position on the middle hand region, which is located between the gripping index finger and gripping thumb on the hand.

The rolling axis of the body is defined in this case as the axis of the body which corresponds to the direction of the greatest extension (i.e., for example, from the measuring probe to an upper point of the marking region or a second operating element arranged there, as will be described in greater detail once again hereafter). The measuring aid can advantageously then be designed in such a manner that the following sections of the measuring aid follow one another in the following sequence along the rolling axis:

measuring probe,
orifice having the first section extending away therefrom,
a second section, which essentially continues a dimensioning of the first section transversely to the rolling axis, so that the first and second sections together form an elongated pin section, which is insertable into a pocket hole having an opening of 3 cm diameter, and
the marking region, wherein this has, at least in one transverse direction, a significantly greater extension transversely to the rolling axis than the first and second sections.

The pin section can have in this case a longitudinal extension in the direction of the rolling axis of at most 15 cm, in particular of approximately between 7 and 12 cm.

The marking region can have, for example a longitudinal extension in the direction of the rolling axis of at most 10 cm, in particular of approximately between 5 and 8 cm,
a transverse extension in a first direction transversely to the rolling axis of at most 10 cm, in particular of approximately between 5 and 8 cm,
a depth extension in a second direction—perpendicular to the first direction—transversely to the rolling axis of at most 7 cm, in particular of approximately between 3 to 6 cm.

The measuring probe and the orifice can be embodied in particular in this case in such a manner that the measuring probe is removable and optionally replaceable. For this purpose, the orifice can be designed as a receptacle for the measuring probe, for example. Different measuring probes (for example, tactile measuring probes having contacting ruby ball, which are arranged on rods of different length) can thus be alternately installed and respectively selected and used for a measuring task depending on the practical conditions.

According to the invention, the first operating element is furthermore arranged on the first section of the measuring aid in such a manner that it is actuatable in the provided holding position (in which the measuring aid is thus located in the precision grip) by the gripping index finger or the thumb, in particular without having to leave the respective provided thumb contact surface or index finger contact surface by very much. The first operating element can be formed in this case, for example, by a pushbutton or by a sliding switch which automatically resets into the starting location after deflection.

The fine details with respect to shaping, design, and placement of said sections, regions, and components of the measuring aid according to the invention are then in the scope of routine considerations for a person skilled in the art—depending on the given requirements.

As is known in the prior art, passive or active light spots which can be acquired by camera represent, for example, the visual markings. The markings can especially be formed by reflectors or by LEDs.

If the measuring aid is provided for cooperation with a laser tracker as a measuring station, a retroreflector, in particular a hollow corner cube retroreflector, can thus furthermore be arranged on the body in a defined spatial relationship in relation to the pattern or the measuring probe. In particular, an arrangement in a center point of the pattern formed by the light spots can be selected.

According to a further aspect—as is also already known per se from the prior art—the communication means can additionally be implemented to receive signals transmitted from the station. For example, the communication means can have for this purpose a receiving diode for detecting radiation emitted on the part of the station in the direction of the measuring aid, onto which the signals are modulated. For example, this can be an IR receiving diode, which receives IR radiation emitted from the station in the direction of the measuring aid. Especially for the case in which the station is a laser tracker and communication is to be performed from the station to the measuring aid via the measuring radiation oriented toward the retroreflector, the receiving diode can be arranged closely adjacent to the retroreflector or downstream from the retroreflector, which is implemented as partially radiation transparent for this purpose, in the measuring radiation propagation direction. If the retroreflector is implemented as a hollow corner cube retroreflector, for example, it can thus be ground in its corner and therefore can be implemented as partially radiation transparent.

According to a further aspect of the invention, the visual markings can be arranged rotationally-symmetrically about an axis of rotational symmetry, which goes through a center point of the pattern, and in at least two different distances to a plane, which is spanned by the center point and the axis of rotational symmetry as a normal.

Furthermore, for an embodiment in which active light spots represent the visual markings, the electronic circuit can be implemented and configured in such a manner that—as a function of an actuation of the first operating element—the visual markings are activated at least partially automatically in the scope of a flashing sequence in a defined chronological sequence and for defined periods of time, so that they flash like a flash at defined points in time—measured from actuation of the first operating element. In particular, the light spots can otherwise (i.e., in intermediate times between measurements or flashing sequences linked thereto) be constantly deactivated to save energy.

According to a further aspect of the invention, the flashing sequence can be defined in such a manner or the electronic circuit for this purpose can be implemented and configured in such a manner that in the scope of the flashing sequence, at least partially different markings of the visual markings are activated and thus a yaw angle absolute reference is made derivable for a station-side determination of a yaw angle of the measuring aid about the axis of symmetry. In a special example for this purpose, for example, the electronic circuit can be implemented and configured in such a manner that in the scope of the flashing sequence, initially only one defined (or two defined [for example, directly adjacent], or also three defined) ones of the visual markings are activated and subsequently during the further flashing, respectively all of the visual markings are activated.

For an embodiment in which active light spots represent the visual markings, the visual markings can in turn also be allocated into two groups in such a manner that they form two concentric patterns, which are respectively optionally activatable and deactivatable, in particular wherein the two groups are alternately respectively activated or deactivated automatically via a control circuit of the measuring aid in reaction to receiving a signal via communication means.

A distance-dependent ability to turn on and use either the outer or the inner group (or the outer or inner pattern) is thus provided, as this is described, for example, in the above-mentioned patent literature publication WO 2007/124010 A2.

By way of the ability according to the invention to hold the measuring aid in the hand like a pen in the precision grip, targeted measuring points on a measured object surface (wherein this is again to be understood to include notches, holes, concealed points, etc., as belonging to the measured object surface of a measured object) can be contacted in an improved manner, without a second guiding hand having to engage the measuring aid instrument for this purpose. The guide of the measuring aid in such a grip can be performed intuitively and without additional special practice in this case (since the corresponding skill is already provided in any case due to the ability typically provided to the user in any case of being able to guide a ballpoint pen precisely and to sensitively contact a surface without excessively strong pressure). In the case of the grips and holding positions known in the prior art for measuring aids which can actually be held in one hand, wherein a rod is to be held in the power grip (i.e., in a first grip), in contrast, it is often necessary for precise guiding of the measuring probe to use the actually non-holding second hand—engaging on the ruby ball or the measuring probe pin holding the ruby ball—for the precise guiding and contacting of a desired point on the measured object surface, to hit the desired point rapidly and precisely (and without running the risk in this case of damaging the measured object surface by imprecise and possibly rough jostling or even unintentional scratching of the surface [for example, a lacquer layer] and therefore damaging the object to be surveyed using the ruby ball).

According to the invention, the assistance of a second hand can thus typically be omitted (which applies both to the fine positioning of the measuring aid and also to the measurement triggering), so that the second hand remains free and can even be used in parallel for other purposes during the measuring task (for example, for supporting the body when leaning into a cockpit of an automobile, for example, if the surface points of a dashboard are to be surveyed and the user may not/cannot find space in the automobile for the surveying task, however).

Furthermore, the invention relates to a system for surveying an object surface made of a measuring aid—as described above—and a station for position and orientation determination of the measuring aid.

The measuring aid can especially have a retroreflector in this case, in particular a hollow corner cube retroreflector, on the body in a defined spatial relationship in relation to the pattern or the measuring probe, and the station can especially be implemented as a laser tracker for aligning a laser beam on the retroreflector. The laser tracker can furthermore have a camera in this case for recording an image of the pattern. Furthermore, the laser tracker can have functionalities for the three-dimensional determination of the position of the retroreflector via laser beam and for the three-dimensional determination of the orientation of the measuring aid via analysis of the recorded image of the pattern.

BRIEF DESCRIPTION OF THE DRAWINGS

The method according to the invention and the device according to the invention will be described in greater detail solely as examples hereafter on the basis of specific exemplary embodiments which are schematically illustrated in the drawings, wherein further details of the invention will also be described. Specifically:

FIGS. 1-8 show various exemplary embodiments and variants of a measuring aid according to the invention;

FIGS. 11-14 show various exemplary embodiments and variants for a station—forming a part of the measuring system according to the invention—for surveying the measuring aid in six degrees of freedom.

DETAILED DESCRIPTION

Figure 6:
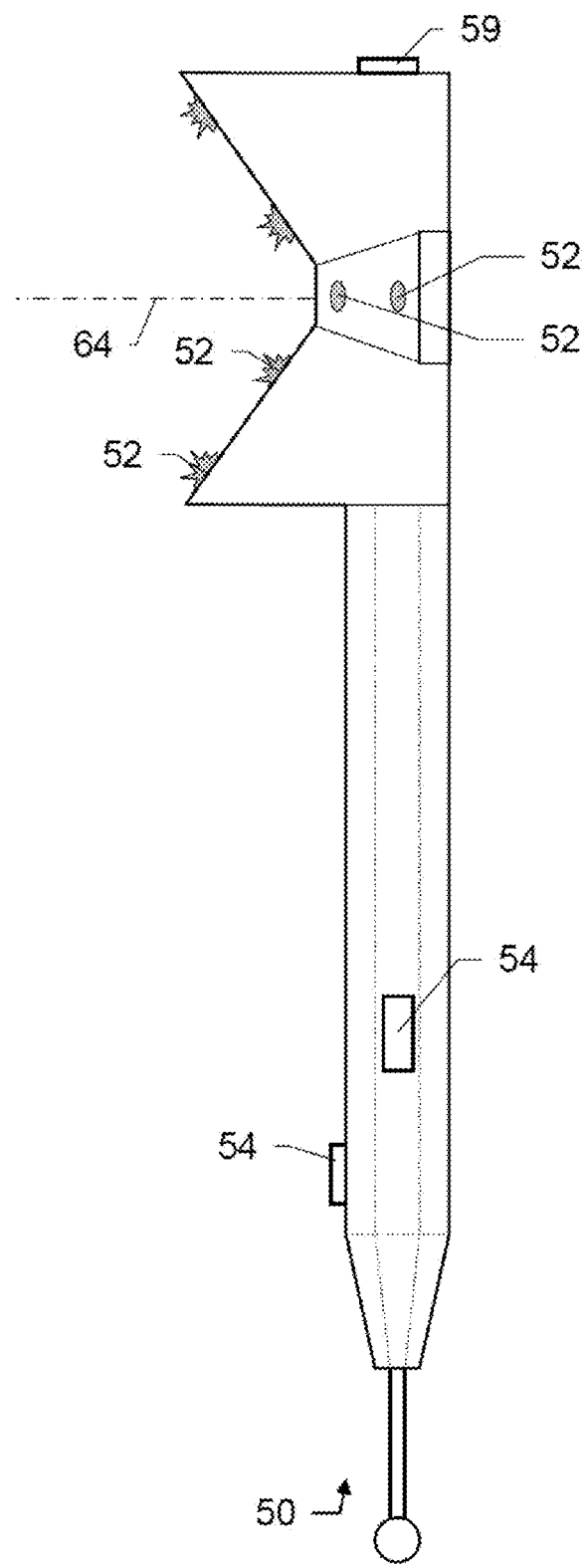

FIGS. 1 and 5 show a handheld measuring aid 50 according to the invention for use in a system—having a station for position and orientation determination of the measuring aid—for surveying an object surface. The measuring aid 50 has in this case a body 62, on which visual markings 52 are arranged in a marking region 58 in a defined spatial relationship to one another, so that they form a pattern.

Furthermore, a measuring probe 53 is arranged in a defined spatial relationship in relation to the pattern at an orifice 55 of the body 62, the measuring probe being formed here as an example by a pin having a ball arranged thereon, which is to be used in a tactile manner for the physical contacting of a measurement point on the object surface.

Furthermore, a first operating element 54 actuatable by a user (for example, an operating button which can be pressed) is provided on the body. Upon actuation, a signal is generated by an electronic circuit, which is indicative of a triggering of a position and orientation determination of the measuring aid, which can be carried out by the surveying station. In addition, wireless communication means are provided for transmitting the signal to the station. These can be—in the case of active light spots (i.e., for example, LEDs—light-emitting diodes) as markings—for example, formed in a second function of the LEDs by the LEDs (coded flashing pattern, which is received and decoded on the part of the station). Alternatively, a separate IR transmitting diode (not shown here) can be provided especially for this purpose, so that the signals transmitted thereby can be received on the part of the station using an IR receiver (for example, similar in principle to the IR remote control technology for televisions).

According to the invention, if the measuring aid—as this is apparent in FIG. 5, for example (in which the measuring aid 50 from FIG. 1 is shown in the measuring position, gripped in the precision grip using the hand of a user)—is designed with respect to overall dimensioning and weight distribution in such a manner, the arrangement localities of the visual markings 52 on the body 62 are selected in such a manner, a first section 56 of the body 62 extending away from the orifice 55 is composed, shaped, and dimensioned in such a manner, and the first operating element 54 is arranged on the first section 56 of the body 62 in such a manner, that the measuring aid 50 is provided in the measuring position to be held in one hand like a pen and in this case the first section 56 is used as a gripping region for at least thumb 65 and index finger 66, and in particular also middle finger of the user, and also in this measuring position, the first operating element 54 is actuatable using the gripping index finger 66.

The measuring aid 50 from FIG. 1 is designed as an example in such a manner that the following sections of the measuring aid 50 follow one another in the following sequence along the rolling axis 63:

measuring probe 53,
orifice 55 having the first section 56 extending away therefrom,
a second section 57, which essentially continues a dimensioning of the first section 56 transversely to the rolling axis 63, so that the first and second sections 56, 57 together form an elongated pin section, which is insertable into a pocket hole having an opening of 3 cm diameter, and
the marking region 58, wherein this has, at least in one transverse direction, a significantly greater extension transversely to the rolling axis 63 than the first and second sections 56, 57.

In the example shown in FIG. 1, the measuring aid 50 is additionally equipped, as a precaution, to be used together with a laser tracker as a measuring station. For this purpose, furthermore a retroreflector 51, in particular a hollow corner cube retroreflector, is arranged on the body 62 in a defined spatial relationship in relation to the pattern or the measuring probe 53. In particular—as shown here—the arrangement of the retroreflector 51 can be provided in a center point of the pattern formed by the light spots 52.

Furthermore, in the example shown in FIG. 1, respectively six light spots are arranged rotationally-symmetrically about an axis of rotational symmetry, which goes through a center point of the pattern (and also forms the yaw angle axis of the measuring aid instrument) on two concentric circular paths as the visual markings 52. Furthermore, the light spots on each circular path are respectively arranged (as is apparent in the side view shown in FIG. 6) in at least two different distances to a plane, which is spanned by the center point and the axis of rotational symmetry as the normal.

The visual markings 52 are allocated into two groups (wherein the respective six light spots arranged on a shared circular path respectively form a group) in such a manner that they form two concentric patterns. The groups are optionally activatable and deactivatable in this case, in particular wherein the two groups are alternately respectively activated or deactivated automatically via a control circuit of the measuring aid in reaction to receiving a signal via communication means. The communication means for receiving a signal emitted from the station can have in this case an IR receiving diode 61, which is arranged here close to the retroreflector 61 in the marking region 58. Such an arrangement of the IR receiving diode 61 can be advantageous (or even necessary) in particular if communication is to be performed via the measuring beam oriented in a targeted manner on the retroreflector from a laser tracker as the measuring station.

FIG. 2 shows a very similar measuring aid instrument 50 as in FIG. 1. In contrast to FIG. 1, the first operating element 54 is arranged on the first section of the body here in such a manner, however, that the first operating element 54 is actuatable using the gripping thumb in the pen-like measuring attitude.

Furthermore, in FIG. 2, the receiving diode 61 used as the receiver for the communication means is now arranged on the pin section as an alternative to the variant shown in FIG. 1. Such a placement of the receiving diode 61 can be selected, for example, if the station uses a light source emitting in a broad spatial angle range (for example, an IR-LED) as the communication means transmitter.

FIG. 3 shows a measuring aid instrument 50 according to the invention implemented slightly differently, as shown in FIG. 1, in particular with regard to the marking region 58. Thus, in the embodiment shown in FIG. 3, respectively four light spots, which are respectively arranged on two concentric circular paths having different diameters (considered without depth effect, i.e., considered projected on a plane) now respectively form a pattern.

FIG. 4 once again shows the exemplary embodiment from FIG. 1, a possible advantageous placement of the batteries/accumulator cells now being illustrated here. The package (i.e., the geometric and functional arrangement of parts and components of the measuring aid instrument) is selected in this case such that the heavier parts of the measuring aid (in particular thus the power supply source here) are partially housed at a position in the second section 57 as close as possible to the first section and are partially housed in or integrated in the first section 56.

A weight distribution can thus be provided, in which an inclined (or also horizontal) position of the measuring aid held using three fingers like a pen can be assumed comfortably and can be held well by a user, and excessively strong torque due to overweight of the upper part extending upward away from the first section does not act on the holding hand in this case.

FIG. 6 shows a side view of a measuring aid 50, which is very similar to the examples shown in FIGS. 1 and 2. The measuring aid 50 has two first operating elements 54 and one second operating element 59 here (in particular for actuation using the second, non-holding hand). The two first operating elements 54 are arranged in this case on the first section, so that one thereof—like that in FIG. 1—is actuatable using the index finger and the other thereof—like that in FIG. 2—is actuatable using the thumb. Furthermore, it is apparent here (as already mentioned above in conjunction with the description of FIG. 1), that the visual markings 52 (light spots) are arranged per group in at least two different distances to a plane, which is spanned by the center point of the pattern and the axis of rotational symmetry (or yaw angle axis 64) as the normal.

Figure 7:
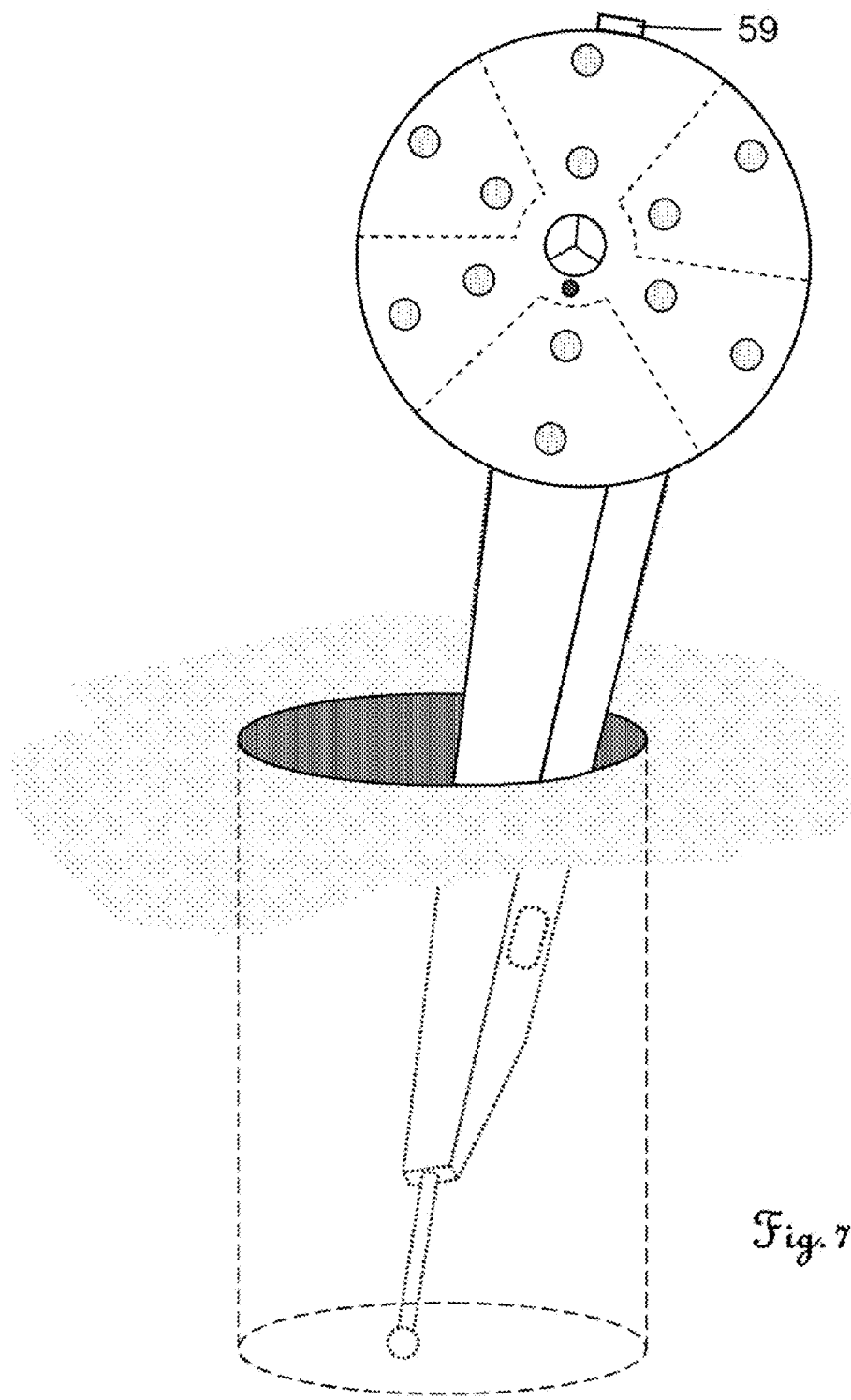

FIG. 7 shows the exemplary embodiment from FIG. 2, which here now has, however—similarly to the exemplary embodiment from FIG. 6—additionally a second operating element 59 located on the body in the marking region (in particular for actuation using the second, non-holding hand).

This also allows the use of the measuring aid in a second measuring attitude or measuring position, in which the measuring aid 50 is held using one hand from the rear on the marking region and the second operating element 59 is actuatable using the second hand, so that the measuring aid 50 is also insertable into a pocket hole and therefore also base points in the pocket hole can be surveyed as measured object surface points.

Figure 8:
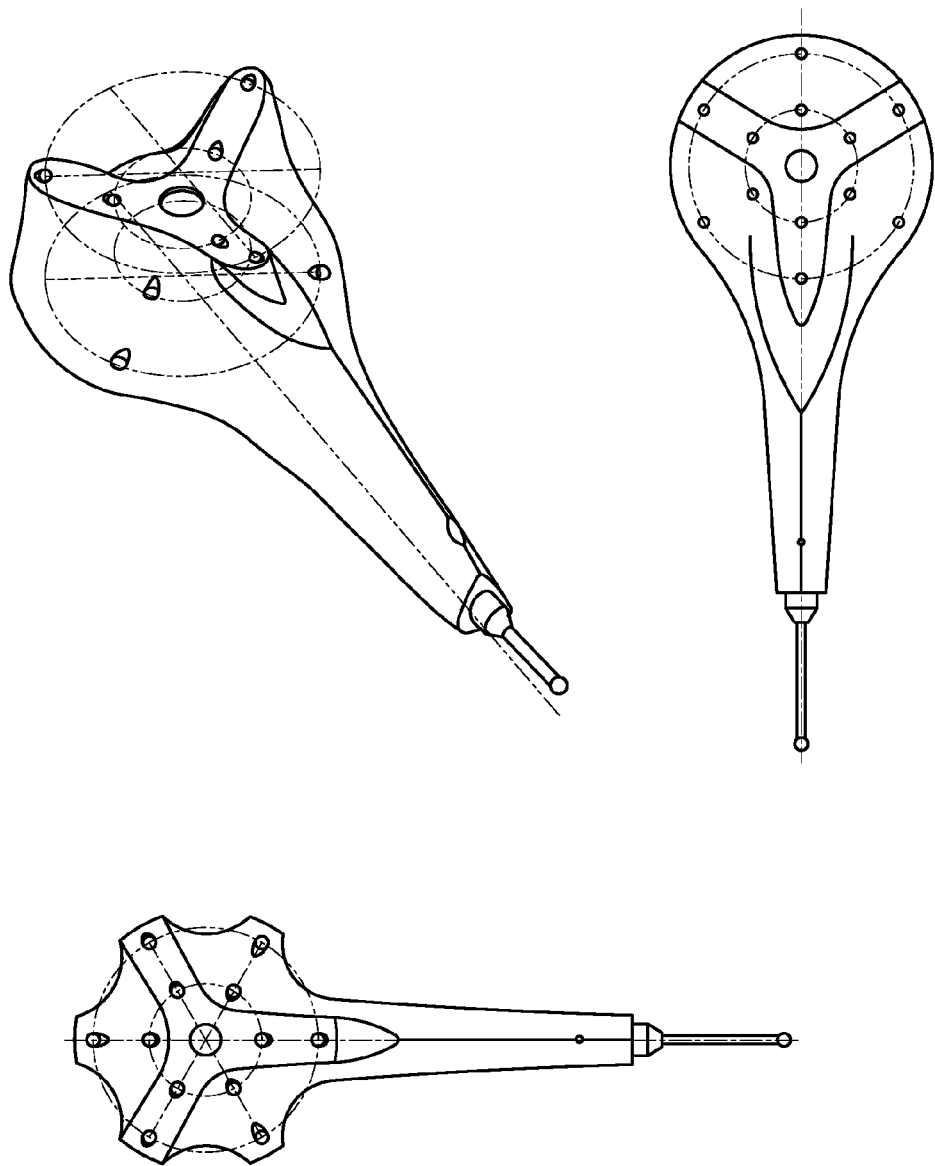

FIG. 8 shows three further possible embodiments of a measuring aid according to the invention, which are very similar in principle and function to the previously shown exemplary embodiments.

Figure 10:
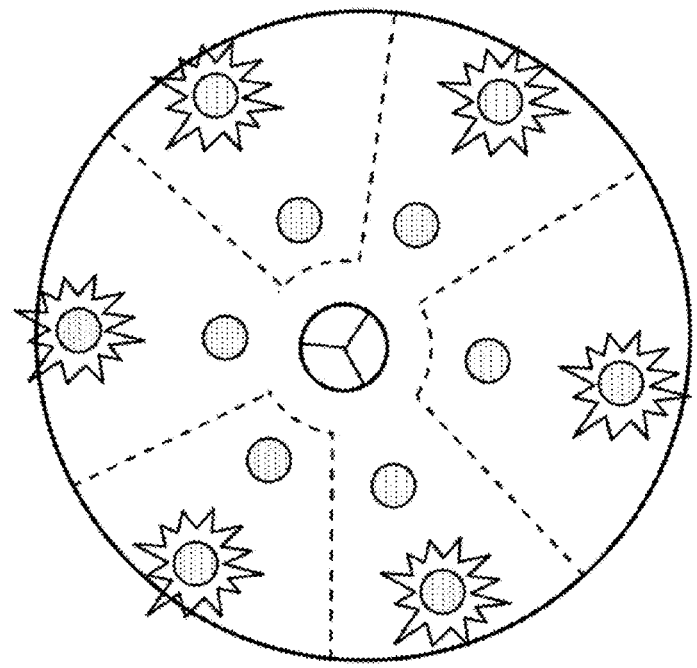
FIGS. 9-10 show an explanatory visualization for an exemplary flashing sequence for determining an absolute reference for the determination of the yaw angle of the measuring aid.
Figure 9:
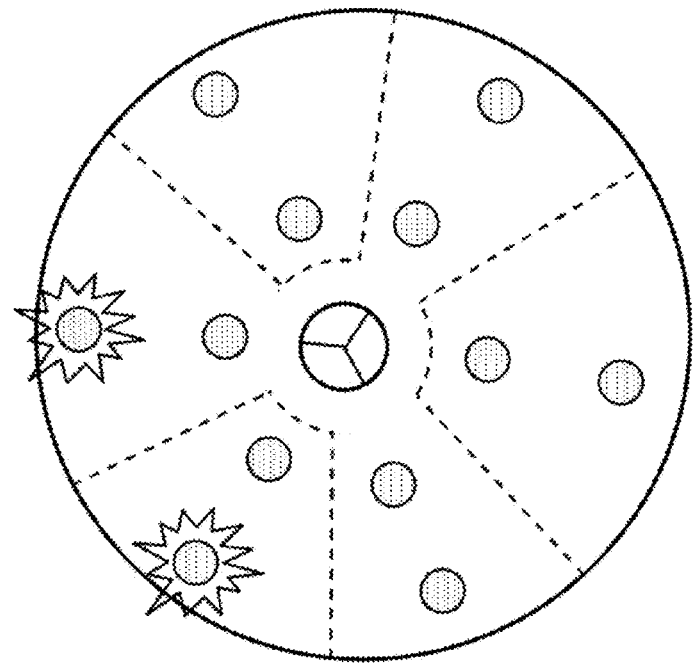

FIGS. 9 and 10 show, considered together, an explanatory visualization of an exemplary flashing sequence for determining an absolute reference for the determination of the yaw angle of the measuring aid. For this purpose, the marking region of the measuring aid from FIG. 1, for example, is visible in the two figures respectively at different flashing points in time within a flashing sequence.

Since the visual markings are arranged rotationally-symmetrically about an axis of rotational symmetry, which goes through a center point of the pattern, the yaw angle cannot be determined absolutely unambiguously—for the case that all markings of a group always flash—on the basis of station-side image recording and analysis. The electronic circuit can therefore now be implemented and configured in such a manner that, in the scope of the flashing sequence, at least partially different markings of the visual markings (of a group) are activated and thus—on the basis of station-side knowledge about which of the light spots are now respectively illuminated during which flashes—a yaw angle absolute reference for a station-side determination of a yaw angle of the measuring aid about the axis of symmetry is made derivable.

For example, the electronic circuit can be implemented and configured in such a manner that in the scope of the flashing sequence, initially only one or two directly adjacent ones of a group (this is shown in FIG. 9) of the visual markings are activated and subsequently respectively all of the visual markings of a group are activated (as shown in FIG. 10).

FIGS. 11 to 14 show various exemplary embodiments and variants for a station—forming a part of the measuring system according to the invention—for surveying the measuring aid in six degrees of freedom (6-DoF).

Figure 13:
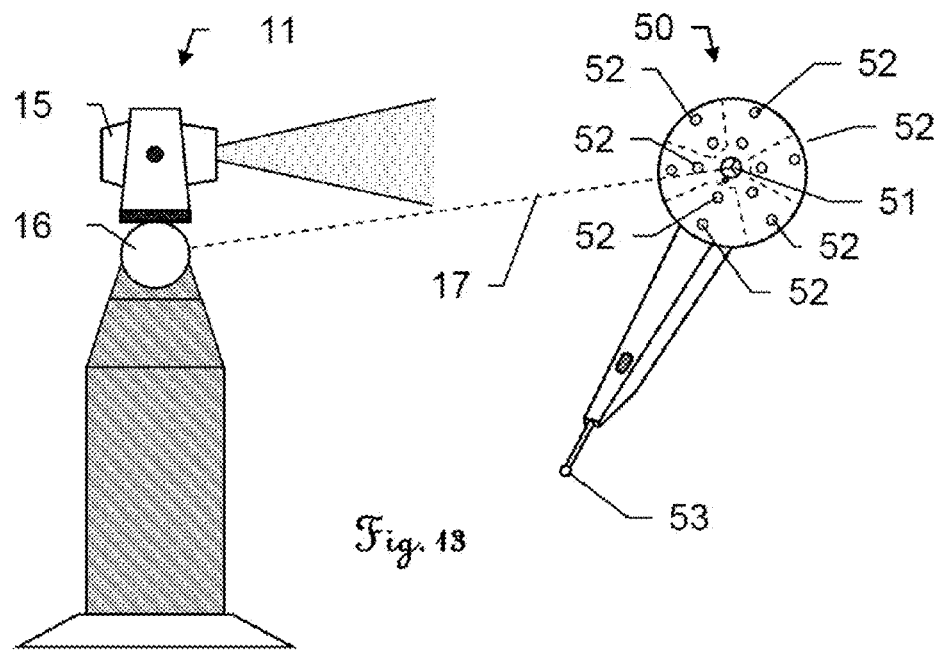

In FIGS. 11 to 13, respectively different variants of laser trackers are shown in use with respectively one measuring aid object 50, the position and orientation of which is to be determined with 6-DoF (i.e., with six degrees of freedom, three translational and three rotational) as respective stations in this case.

The first laser tracker 10 (FIG. 11) has a base 40 and a support 30, wherein the support 30 is arranged so it is pivotable or rotatable in relation to the base 40 about a pivot axis 41, which is defined by the base 40.

In addition, a targeting unit 20 (pivot unit) is arranged on the support 30 in such a manner that the targeting unit 20 is rotatable about a tilt axis (inclination or transit axis) in relation to the support 30. A laser beam 21 emitted from this unit 20 can be aligned exactly and therefore retroreflectors can be targeted by an alignment capability of the targeting unit 20 thus provided about two axes. This alignment can be performed automatically by means of motorization. The pivot axis 41 and the inclination axis are arranged essentially orthogonally to one another in this case, i.e., slight deviations from exact axis orthogonality can be predetermined and stored in the system, for example, to compensate for measuring errors thus resulting.

In the arrangement shown, the measuring laser beam 21 is oriented on the retroreflector 51 of the measuring aid object 50 and is retroreflected thereon back to the laser tracker 10. By means of this measuring laser beam 21, a distance to the object 50 or to the reflector 51 can be determined, in particular by means of runtime measurement, by means of the phase measurement principle, or by means of the Fizeau principle. The laser tracker 10 has for this purpose a distance measuring unit (for example, having interferometer and absolute distance meter) and angle meters, which make it possible to determine a position of the targeting unit 20, by means of which the laser beam 21 can be aligned and guided in a defined manner, and therefore a propagation direction of the laser beam 21.

In addition, the laser tracker 10, in particular the pivot unit 20, has an image acquisition unit. This image acquisition unit can, for the purpose of a position determination of a sensor exposure on a sensor or in an acquired image, have a CMOS or is implemented in particular as a CCD camera or pixel sensor array camera. Such sensors allow a position-sensitive detection of acquired exposure on the detector. As previously described in conjunction with FIG. 1, the measuring aid object 50 has a tactile sensor 53, the ruby ball of which can be brought into contact with a target object surface to be surveyed. While this contact exists between the scanning tool 50 and the measured object surface, a position of the contact point 53 in space and therefore the coordinates of the scanned point on the measured object surface can be exactly determined. This determination is performed by means of a defined relative positioning of the contact point 53 to the reflector 51 and to reference features 52 arranged on the measuring aid object 50, which can be implemented as light-emitting diodes 52 (LEDs), for example. Alternatively, the reference features 52 can also be implemented in such a manner, however, that they reflect the incident radiation in the event of illumination, for example, using radiation of a defined wavelength (for example, reflectively implemented markings 52), in particular they display a specific luminescence characteristic, or they have a defined pattern or color coding. Therefore, an orientation of the scanning tool 50 can be determined, from the location or distribution of the light spots generated by the reference features 52, in an image acquired using a sensor of the image acquisition unit.

The acquired image of the measuring aid object 50 or the provided light spots of the object 50 is therefore used as the foundation for the determination of the orientation. For a focused acquisition of the LEDs 52 using an optimum and known image scale in particular, the laser tracker 10 can have a vario-zoom optic, i.e., two optical assemblies (for example, lenses) positionable independently of one another in relation to the image acquisition sensor.

For this final orientation determination, the laser tracker 10 furthermore has a special image recording and analysis functionality, which is executable by a control and processing unit of the tracker 10. In the scope of this embodiment, an image of the reference features 52 of the measuring aid instrument 50 is acquired and the orientation or alignment of the measuring aid object 50 is derived based on image positions for the light spots acquired in the image by means of image processing. In this case, the camera is aligned in such a manner that an image can be acquired in the direction of the measuring aid 50 targeted by means of the laser beam 21.

The second laser tracker 10—see FIG. 12—can be implemented essentially similarly to that from FIG. 11 in this case. One difference is that the camera integrated in the targeting unit 20 for recording the image of the pattern formed by the markings 52 is arranged and aligned coaxially to the laser and measuring axis. An example of such an embodiment of a laser tracker is described, for example, in the European patent application having the number EP 13167256.0.

The third laser tracker 11 (see FIG. 13) has a beam guiding unit 16, which is separate from a pivotable camera unit 15 (having, for example, a vario-zoom objective), for emitting a second laser beam 17, which is also aligned on the reflector 51. Both the laser beam 17 and also the camera unit 15 are respectively pivotable by motors about two axes and can thus be aligned in such a manner that by means of the camera 15, a region around the retroreflector 51 targeted using the laser beam 17 (and therefore the LEDs 52 of the measuring aid object 50) can be acquired. Therefore, a precise distance to the reflector 51 and an orientation of the object 50 can also be determined here on the basis of an image analysis of the positions of the light spots in the recorded image (while using the known spatial relationship of the LEDs 52 among one another).

For the respective alignment of the laser beams 17, 21 on the reflector 51, illumination means for illuminating the reflector 51 using radiation of a specific wavelength, in particular in the infrared wavelength range, are respectively provided on the laser trackers 10, 11, and additionally at least one target search camera having a position-sensitive detector, a so-called ATR camera (automatic target recognition), is arranged on each tracker 10, 11.

The distance measuring unit of the respective laser tracker 10, 11 provides an item of distance information to the retroreflector 51 on the basis of a determination of a relative or absolute distance between the respective tracker 10, 11 and the retroreflector 51 and a determination of a change of this distance. If the absolute distance is determined in this case in particular by means of runtime measurement, by means of the phase measurement principle, or by means of the Fizeau principle, a measurement using an interferometer associated with the respective distance measuring unit is thus carried out to determine the distance change. The measuring radiation 17, 21 is emitted from the tracker 10, 11 in such a manner that it is incident on the retroreflector 51 and is reflected back thereon. The reflected beam or parts of the reflected beam are then in turn acquired on the part of the tracker 10, 11 and guided along a measuring path to the interferometer detector, where the reference radiation is superimposed with the received measuring radiation 17, 21. By way of this superposition, an interference pattern results from the two types of radiation, which can be acquired and resolved on the detector. A distance change can be determined, for example, by progressive detection of a change between maxima (constructive interference) and minima (destructive interference). In particular, the detected intensity maxima and/or intensity minima are progressively counted in this case.

Figure 14:
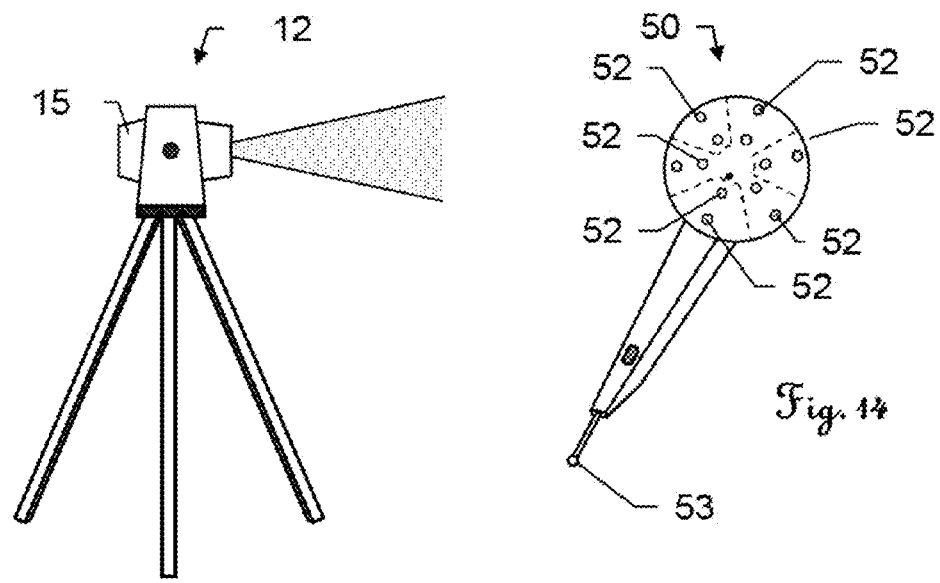

The station 12 shown in FIG. 14 for surveying the measuring aid 50 in six degrees of freedom is solely based in this case on the camera image recording and analysis of the recorded pattern (which is formed by the visual markings 52) in the image, as described, for example, in the patent literature publications WO 2007/124009 A2 or WO 2007/124010 A2. The measuring aid then does not necessarily also have to have a retroreflector in addition to the markings 52 (as is the case in the embodiment of the measuring aid instrument 50 shown in FIG. 14 and also accordingly implemented without a reflector). For example, the station 12 can have a motorized pivotable and tiltable camera unit 15, or, however, the field of vision of a camera can also be able to be aligned variably via a mirror pivotable or tiltable by motors in two axes.

It is obvious that these illustrated figures only schematically illustrate possible exemplary embodiments. The various approaches can also be combined with one another and also with devices or methods of the prior art.

What is claimed is:

1. A handheld measuring aid for use in a system—having a station for position and orientation determination of the handheld measuring aid—for surveying an object surface, the handheld measuring aid comprising:
    a body;
    visual markings, which are arranged in a defined spatial relationship, forming a pattern, on the body in a marking region;
    a measuring probe, which is arranged on an orifice of the body in a defined spatial relationship in relation to the pattern, for the object surface, having a ball to be used in a tactile manner for physically contacting a measurement point on the object surface;
    a first operating element actuatable by a user;
    an electronic circuit for generating a signal that occurs as a function of an actuation of the first operating element and is indicative of a triggering of a position and orientation determination of the handheld measuring aid which can be carried out by the station; and
    wireless communication means for transmitting the signal to the station;
    wherein:
        the first operating element is arranged on a first section of the body extending away from the orifice, and
        the handheld measuring aid is designed to be held, in a measuring position of the handheld measuring aid, in one hand like a pen, wherein, in this measurement position:
            the first section is used as a gripping region for at least a thumb and an index finger of the user, and
            the first operating element is actuatable using the gripping thumb or the gripping index finger;
        wherein a rolling axis is defined by the body as the axis of the body which corresponds to the direction of the greatest extension, wherein the following sections of the handheld measuring aid follow one another in the following sequence along the rolling axis:
            measuring probe,
            orifice having the first section extending away therefrom,
            a second section, which essentially continues a dimensioning of the first section transversely to the rolling axis, so that the first and second sections together form an elongated pin section, which is insertable into a pocket hole having an opening of 3 cm diameter, and the marking region, wherein this has, at least in one transverse direction, a significantly greater extension transversely to the rolling axis than the first and second sections.

2. The handheld measuring aid according to claim 1, wherein the visual markings are passive or active light spots, which can be acquired by a camera.

3. The handheld measuring aid according to claim 2, wherein the passive or active light spots are formed by reflectors or by LEDs.

4. The handheld measuring aid according to claim 1, wherein a retroreflector is arranged on the body in a defined spatial relationship in relation to the pattern or the measuring probe.

5. The handheld measuring aid according to claim 4, wherein the retroreflector comprises a hollow corner cube retroreflector, and the defined spatial relationship is in relation with a center point of the pattern.

6. The handheld measuring aid according to claim 1, wherein the communication means are additionally implemented to receive signals transmitted from the station, wherein the communication means includes a receiving diode for detecting measuring radiation emitted on the part of the station in the direction of the measuring aid, onto which the signals are modulated, wherein the receiving diode is arranged closely adjacent to the retroreflector and/or downstream from the retroreflector, which is implemented as partially radiation transparent for this purpose, in the measuring radiation propagation direction.

7. The handheld measuring aid according to claim 1, wherein the first section has a mean transverse/depth extension transversely to the rolling axis of at most 4 cm and at least 0.5 cm.

8. The handheld measuring aid according to claim 1, wherein the pin section has a longitudinal extension in the direction of the rolling axis of at most 15 cm.

9. The handheld measuring aid according to claim 1, wherein the pin section has a longitudinal extension in the direction of the rolling axis of approximately between 7 and 12 cm.

10. The handheld measuring aid according to claim 1, wherein the marking region has
   a longitudinal extension in the direction of the rolling axis of approximately between 5 and 8 cm,
   a transverse extension in a first direction transversely to the rolling axis of approximately between 5 and 8 cm, and
   a depth extension in a second direction that is perpendicular to the first direction transversely to the rolling axis of approximately between 18 to 6 cm.

11. The handheld measuring aid according to claim 1, wherein the marking region has
   a longitudinal extension in the direction of the rolling axis of at most 10 cm;
   a transverse extension in a first direction transversely to the rolling axis of at most 10 cm; and
   a depth extension in a second direction that is perpendicular to the first direction transversely to the rolling axis of at most 7 cm.

12. The handheld measuring aid according to claim 1, wherein,
   wherein the visual markings are active light spots that are allocated into two groups so that they form two concentric patterns, which are respectively optionally activatable and deactivatable, wherein the two groups are alternately respectively activated or deactivated automatically via a control circuit of the handheld measuring aid in reaction to receiving a signal via communication means.

13. A system for surveying an object surface made of a measuring aid according to claim 1 and a station for position and orientation determination of the measuring aid.

14. The system according to claim 13, wherein the handheld measuring aid has a retroreflector on the body in a defined spatial relationship in relation to the pattern or the measuring probe, and wherein the station is implemented as a laser tracker for aligning a laser beam on the retroreflector, wherein the laser tracker additionally has a camera for recording an image of the pattern, and wherein the laser tracker has functionalities for the three-dimensional determination of the position of the retroreflector via laser beam and for the three-dimensional determination of the orientation of the handheld measuring aid via analysis of the recorded image of the pattern.

15. The system according to claim 14, wherein the retroreflector comprises a hollow corner cube retroreflector.

16. A handheld measuring aid for use in a system—having a station for position and orientation determination of the handheld measuring aid—for surveying an object surface, the handheld measuring aid comprising:
   a body;
   visual markings, which are arranged in a defined spatial relationship, forming a pattern, on the body in a marking region;
   a measuring probe, which is arranged on an orifice of the body in a defined spatial relationship in relation to the pattern, for the object surface, having a ball to be used in a tactile manner for physically contacting a measurement point on the object surface;
   a first operating element actuatable by a user;
   an electronic circuit for generating a signal that occurs as a function of an actuation of the first operating element and is indicative of a triggering of a position and orientation determination of the handheld measuring aid which can be carried out by the station; and
   wireless communication means for transmitting the signal to the station;
   wherein:
      the first operating element is arranged on a first section of the body extending away from the orifice, and the handheld measuring aid is designed to be held, in a measuring position of the handheld measuring aid, in one hand like a pen, wherein, in this measurement position:
         the first section is used as a gripping region for at least a thumb and an index finger of the user, and
      the first operating element is actuatable using the gripping thumb or the gripping index finger,
      wherein the visual markings are arranged rotationally-symmetrically about an axis of rotational symmetry, which goes through a center point of the pattern, and in at least two different distances to a plane, which is spanned by the center point and the axis of rotational symmetry as the normal,
      wherein the electronic circuit is implemented and configured so that in the scope of the flashing sequence, at least partially different markings of the visual markings are activated and thus a yaw angle absolute reference is made derivable for a station-side determination of a yaw angle of the handheld measuring aid about the axis of symmetry.

17. The handheld measuring aid according to claim 16, wherein active light spots represent the visual markings, wherein the electronic circuit is implemented and configured so that—as a function of an actuation of the first operating element—the visual markings are activated at least partially automatically in the scope of a flashing sequence in a defined chronological sequence and for defined periods of time, so that they flash like a flash at defined points in time—measured from actuation of the first operating element.

18. The handheld measuring aid according to claim 16, wherein the electronic circuit is implemented and configured so that in the scope of the flashing sequence, initially only one or two directly adjacent ones of the visual markings are activated and subsequently respectively all of the visual markings are activated.

* * * * *